(12) United States Patent
Pascual (10) Patent No.: US 11,704,146 B2
(45) Date of Patent: Jul. 18, 2023

(54) NETWORK TRANSPARENCY ON VIRTUAL MACHINES USING SOCKET IMPERSONATION

(71) Applicant: Red Hat, Inc., Raleigh, NC (US)

(72) Inventor: Sergio Lopez Pascual, Madrid (ES)

(73) Assignee: Red Hat, Inc., Raleigh, NC (US)

( * ) Notice: Subject to any disclaimer, the term of this patent is extended or adjusted under 35 U.S.C. 154(b) by 291 days.

(21) Appl. No.: 16/906,679

(22) Filed: Jun. 19, 2020

(65) Prior Publication Data
US 2021/0397467 A1    Dec. 23, 2021

(51) Int. Cl.
*G06F 9/455* (2018.01)
*H04L 69/16* (2022.01)
*H04L 67/10* (2022.01)

(52) U.S. Cl.
CPC ........ *G06F 9/45558* (2013.01); *H04L 69/162* (2013.01); *G06F 2009/45579* (2013.01); *G06F 2009/45591* (2013.01); *G06F 2009/45595* (2013.01); *H04L 67/10* (2013.01)

(58) Field of Classification Search
CPC ....... G06F 9/45558; G06F 2009/45579; G06F 2009/45591; G06F 2009/45595; H04L 69/162; H04L 67/10
See application file for complete search history.

(56) References Cited

U.S. PATENT DOCUMENTS

| 6,401,109 B1 * | 6/2002 | Heiney ..................... G06F 9/54 718/1 |
| 8,307,415 B2 * | 11/2012 | Khan .................... H04L 45/745 713/153 |
| 2012/0198440 A1 * | 8/2012 | Shah ....................... G06F 9/545 718/1 |
| 2013/0133061 A1 * | 5/2013 | Fainkichen ............. G06F 9/455 726/15 |
| 2013/0227565 A1 * | 8/2013 | Lee ..................... G06F 9/45558 718/1 |
| 2014/0119373 A1 * | 5/2014 | Barabash ............ G06F 9/45558 370/392 |

(Continued)

OTHER PUBLICATIONS

Firecracker, Using the Firecracker Virtio-vsock Device, 2020; https://github.com/firecracker-microvm/firecracker/blob/master/docs/vsock.md retrieved Apr. 1, 2020 (5 pages).

(Continued)

*Primary Examiner* — Michael W Ayers
(74) *Attorney, Agent, or Firm* — K&L Gates LLP (57) ABSTRACT

A system includes a hypervisor, a virtual machine (VM), and a host system. The VM includes a kernel and an application and the VM is in communication with the hypervisor. The host system includes a memory and one or more processors, where the one or more processors are in communication with the memory. The host system hosts the VM and the hypervisor. The one or more processors is configured to perform creating, via the kernel, a first socket accessible to the application. A second socket in communication with an endpoint is created at the host system. A virtual communication channel between the hypervisor and the kernel of the VM connects the first socket to the hypervisor. The hypervisor is configured to transmit inputs/outputs (I/Os) received from the application through the virtual channel to the endpoint via the second socket.

20 Claims, 9 Drawing Sheets

(56) References Cited

U.S. PATENT DOCUMENTS

| | | | | |
|---|---|---|---|---|
| 2014/0214958 A1* | 7/2014 | Cheshire | ............. | H04L 61/4541 |
| | | | | 709/204 |
| 2018/0007178 A1* | 1/2018 | Subhraveti | .............. | G06F 9/541 |
| 2019/0132296 A1* | 5/2019 | Jiang | ..................... | H04L 63/029 |
| 2020/0322423 A1* | 10/2020 | Sheth | .................. | H04L 67/1001 |
| 2021/0042142 A1* | 2/2021 | Sharma | ............... | H04L 12/4641 |
| 2021/0224094 A1* | 7/2021 | Wu | ..................... | G06F 9/45558 |

OTHER PUBLICATIONS

Andy King (/patchwork/project/lkml/list/?submitter=13945); VSOCK: Introduce VM Sockets, Feb. 7, 2013; retrieved Apr. 7, 2020 (101 pages).

* cited by examiner

NETWORK TRANSPARENCY ON VIRTUAL MACHINES USING SOCKET IMPERSONATION

BACKGROUND

A virtual machine is software that is executed on hardware to create a virtualization of a physical computer system. Virtual machines may function as self-contained platforms that run their own operating systems and software applications. A host machine, such as a server computer may concurrently run one or more virtual machines using a hypervisor. The hypervisor allocates a certain amount of the host's resources, such as the host's underlying physical processors and memory devices, to each of the virtual machines, allowing the virtual machines to transparently access the host's resources. Each virtual machine may use the allocated resources to execute applications, including operating systems referred to as guest operating systems. Each guest operating system may be accessed by one or more local or remote clients to perform computing tasks.

SUMMARY

The present disclosure provides new and innovative systems and methods for transparent networking from a virtual machine using socket impersonation and enlightened drivers. In an example, a method includes creating, via a kernel within a virtual machine (VM), a first socket accessible to an application on the VM. The VM is hosted by a host system and in communication with a hypervisor. A second socket is created at the host system in communication with an endpoint. A virtual communication channel is created between the hypervisor and the kernel of the VM, which connects the first socket to the hypervisor. Next, the hypervisor is configured to transmit inputs/outputs (I/Os) received from the application through the virtual channel to the endpoint via the second socket.

In an example, a system includes a hypervisor, a virtual machine (VM), and a host system. The VM includes a kernel and an application and the VM is in communication with the hypervisor. The host system includes a memory and one or more processors, where the one or more processors are in communication with the memory. The host system hosts the VM and the hypervisor. The one or more processors is configured to perform creating, via the kernel, a first socket accessible to the application. A second socket in communication with an endpoint is created at the host system. A virtual communication channel between the hypervisor and the kernel of the VM connects the first socket to the hypervisor. The hypervisor is configured to transmit inputs/outputs (I/Os) received from the application through the virtual channel to the endpoint via the second socket.

In an example, a non-transitory machine readable medium storing code, which when executed by a processor, is configured to create, via a kernel within a virtual machine (VM), a first socket accessible to an application on the VM. The VM is hosted by a host system and the VM is in communication with a hypervisor. A second socket in communication with an endpoint is created at the host system. A virtual communication channel is created between the hypervisor and the kernel of the VM that connects the first socket to the hypervisor. The hypervisor is configured to transmit inputs/outputs (I/Os) received from the application through the virtual channel to the endpoint via the second socket.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF PREFERRED EMBODIMENTS

Techniques are disclosed for providing transparent network communication capabilities from a virtual machine. With the use of virtual machines (VMs) becoming more prominent in industry, there is a need for simplification and transparency for applications running from a virtual machine. Traditionally, the difficulty with applications that may reside within a virtual machine is whether the application would benefit from awareness of the virtual environment. Typically, an application written without any awareness may function, but does not take full advantage of any optimizations or shortcuts that are a part of the virtual environment. Generally, an application executing on a VM having the ability to simply, seamlessly, and transparently communicate with its host and other devices without requiring awareness would benefit application development in industry overall.

For example, traditionally, network communication from a VM can be classified into two categories. First is network communication using the traditional implementation of sockets, which enables the VM to communicate with any device on a network, and second is network communication using virtual sockets, which facilitates communication with virtual machines on the host and the host itself. With awareness of virtualization, an application can be fully function and able to communicate with VMs on a host and the host itself without burdening the host's network interface. Without awareness of virtualization, an application can only communicate using the host's network interface, potentially burdening and/or overloading the system with network packets. However, developing a solution that removes the requirement of awareness, removes the burden of developing an application specifically for a virtual machine or a physical computer.

As described in various examples disclosed herein, to facilitate providing transparent network capabilities to an application on a virtual machine, the systems and methods disclosed herein advantageously provide a VM capability to communicate directly with the host, hosted VMs, and devices external to the host while using a single interface. In various examples, a plurality of VMs may reside on a single host. In these instances, an application executing on a single VM may require a network communication link with a device on the network, a VM residing on the host, or the host itself. In various examples, development of the application may be simplified by removing the complexity of making a decision of which network interface to implement for each type of communication. In many examples, network transparency, combined with storage transparency, may also allow for deployment of VM-isolated containers that expose services to other containers in the same Pod and/or host.

In various examples, a VM may be aware of its host and/or a hypervisor on the host. In some examples, a kernel executing and/or operating within a VM may be aware of the VM's host and/or a hypervisor on the host. In various instances, the kernel and/or VM may be used interchangeably when describing managing and/or re-routing network communication with an application executing from a VM. In many examples, an application may use generic network communication protocols (e.g., AF_UNIX, AF_INET, or AF_INET6 sockets) to communicate with a host, other VMs, and/or other network devices. In these instances, the kernel and/or the VM may receive a network connection request from the application and reroute and/or reconfigure the communication channel depending on the endpoint. In some instances, an endpoint may be the host itself, a VM residing on the host, or a device or computer external to the host.

In various examples, the kernel and/or the VM may determine that a network connection request to connect to an endpoint relates to a host, a VM residing on the host, or a device external to the host. In these examples, the kernel may communicate with a hypervisor residing on the host to determine whether the endpoint exists. Upon determining that the endpoint exists, the hypervisor creates a network communication link with the endpoint and creates a virtual communication channel with the application. In these instances, the kernel impersonates the original socket requested by the application using the virtual communication channel. Further, in these instances, communication with the endpoint is directed through the virtual communication channel and through the network communication link at the host. In various examples, the virtual communication channel is a virtual socket connection between an application and the hypervisor. In many instances, the communication between the host and the kernel to configure the virtual communication channel may be facilitated by a virtual input/output (I/O) device based control plane between the kernel and the hypervisor. In these instances, a virtual I/O device may be an abstraction of the host's physical hardware, where a host's internal bus may be abstracted to appear as a control plane between each VM and a hypervisor.

In certain examples, the kernel and/or the VM may determine that a network connection request to connect to an endpoint relates to an endpoint local to the VM itself. In these instances, the kernel determines and/or verifies that the endpoint is indeed local to the VM and connects the application to the endpoint using a regular network socket. In both examples, the application does not need to make a decision as to which network communication protocol to use, and rather, may simply implement a single interface to communicate with any network device.

Figure 1:
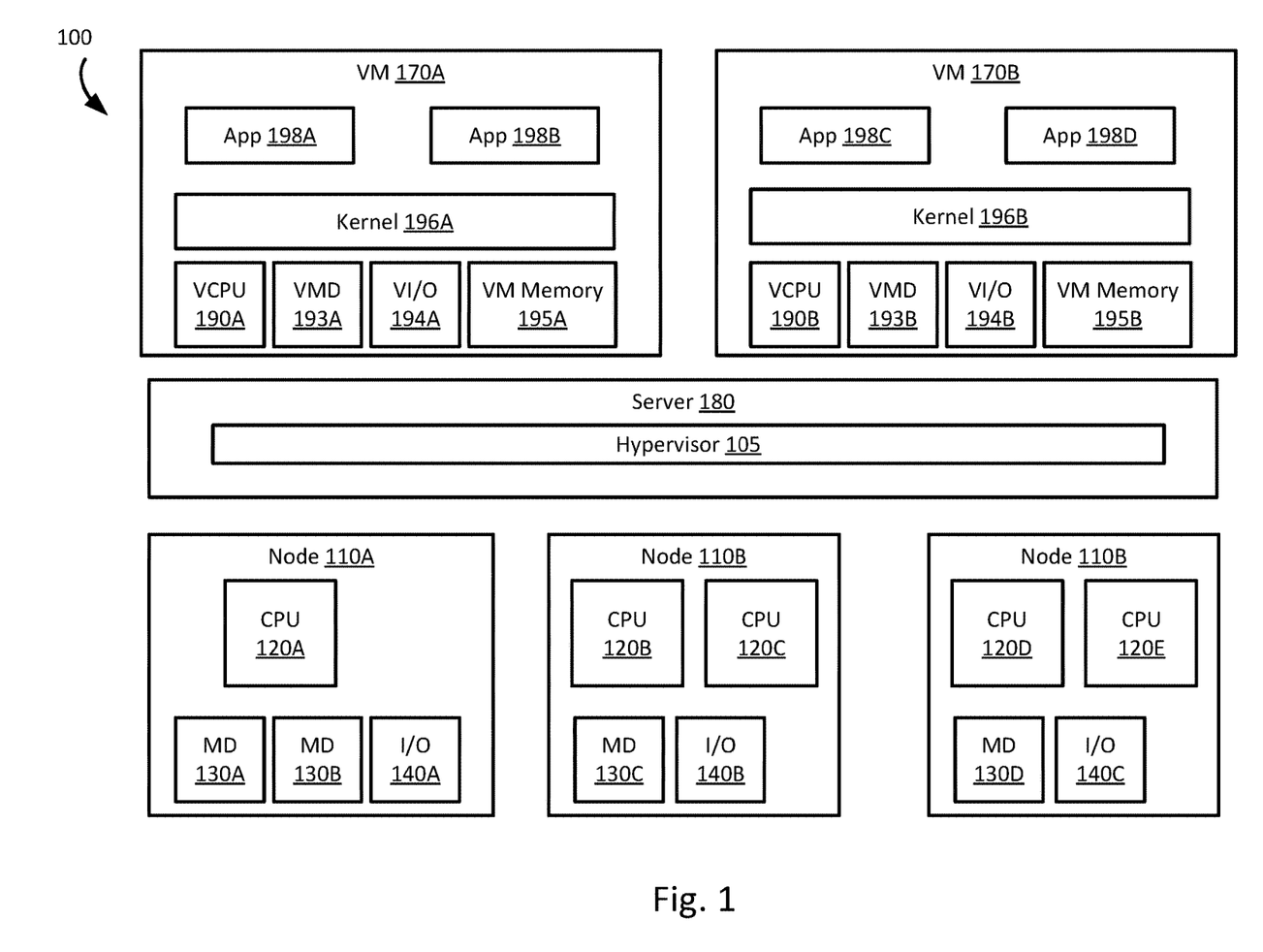
FIG. 1 illustrates a high level component diagram of an example computing system in accordance with one or more aspects of the present disclosure.

FIG. 1 depicts a high-level component diagram of an example computing system 100 in accordance with one or more aspects of the present disclosure. The computing system 100 may include a server 180, one or more virtual machines (VM 170A-B, 170 generally), and nodes (e.g., nodes 110A-C, 110 generally). The server 180 may include a hypervisor 105, which may create, support, and/or run the VMs 170.

Virtual machines 170A-B may include a virtual machine memory (VM Memory), a virtual CPU (VCPU), virtual memory devices (VIVID), virtual input/output devices (VI/O), and a kernel. For example, virtual machine 170A may include virtual machine memory 195A, a virtual CPU 190A, a virtual memory devices 193A, a virtual input/output device 194A, and kernel 196A. Similarly, virtual machine 170B may include virtual machine memory 195B, a virtual CPU 190B, a virtual memory devices 193B, virtual input/output device 194B, and kernel 196B. In an example, Applications 198A-D may be different applications or services. In another example, applications 198A-D may be different instances of the same application or service. In an example, each kernel (e.g., 196A, 196B) may manage the VMMemory (e.g., 195A, 195B), VCPU (e.g., 190A, 190B), VIVID (e.g., 193A, 193B), and VI/O (e.g., 194A, 194B) of each VM 170.

In an example, a virtual machine 170A may execute a guest operating system and run applications 198A-B which may utilize the underlying VCPU 190A, VIVID 193A, and VI/O device 194A. One or more applications 198A-B may be running on a virtual machine 170A under the respective guest operating system. A virtual machine (e.g., VM 170A-B, as illustrated in FIG. 1) may run on any type of dependent, independent, compatible, and/or incompatible applications on the underlying hardware and operating system ("OS"). In an example, applications (e.g., App 198A-B) run on a virtual machine 170A may be dependent on the underlying hardware and/or OS. In another example embodiment, applications 198A-B run on a virtual machine 170A may be independent of the underlying hardware and/or OS. For example, applications 198A-B run on a first virtual machine 170A may be dependent on the underlying hardware and/or OS while applications (e.g., application 198C-D) run on a second virtual machine (e.g., VM 170B) are independent of the underlying hardware and/or OS. Additionally, applications 198A-B run on a virtual machine 170A may be compatible with the underlying hardware and/or OS. In an example embodiment, applications 198A-B run on a virtual machine 170A may be incompatible with the underlying hardware and/or OS. For example, applications 198A-B run on one virtual machine 170A may be compatible with the underlying hardware and/or OS while applications 198C-D run on another virtual machine 170B are incompatible with the underlying hardware and/or OS.

In an example, virtual machines 170A-B may instead be containers that execute applications or services, such as microservices. In an example, the containers may each run a process or service and the containers may be any execution environment. For example, the containers may be a virtual server. It should be appreciated that containers may be stand alone execution environments, similar to that of a virtual machine. The applications 198A-D or services (e.g., microservices) may run in a software container or a virtual machine (e.g., virtual machines 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
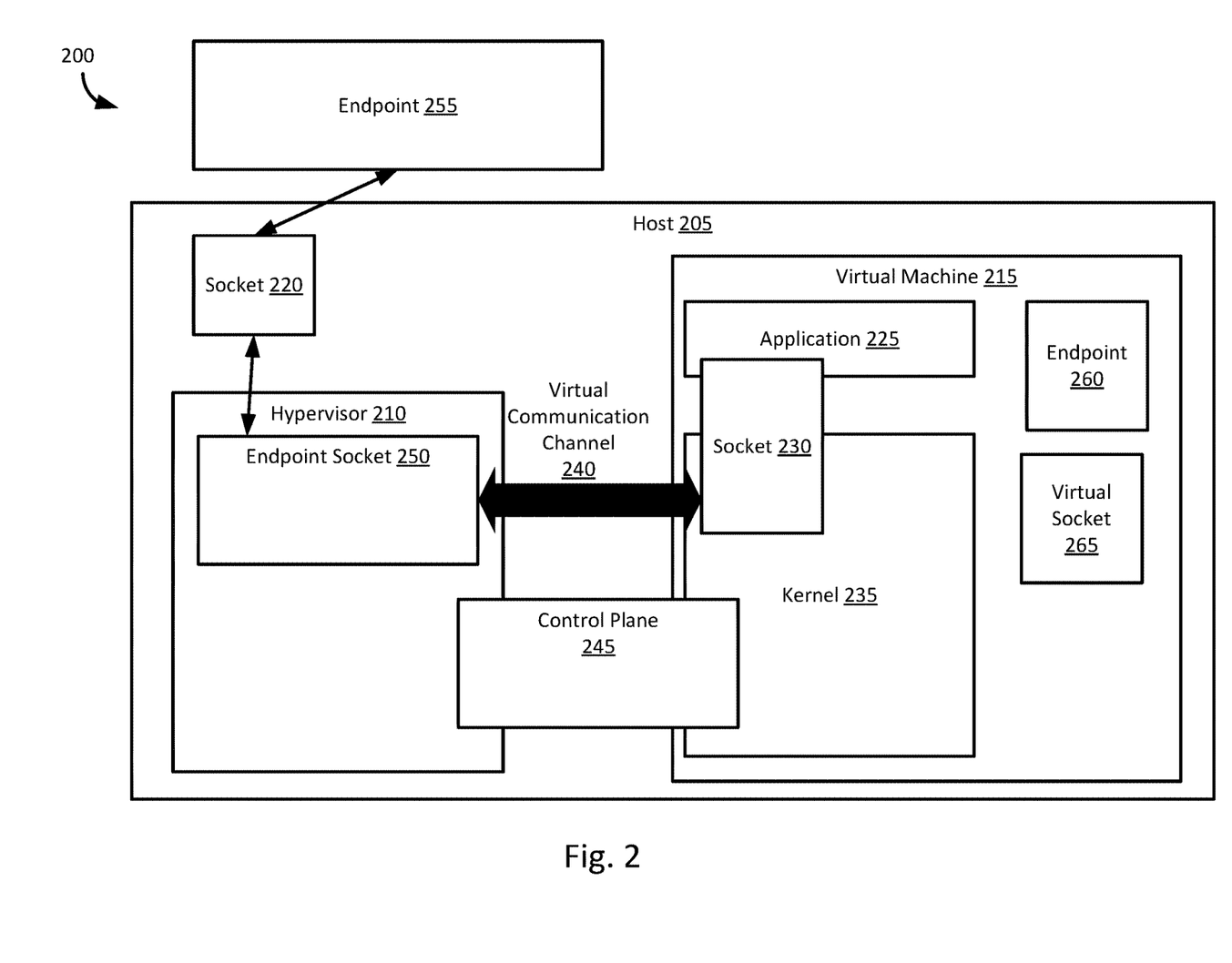
FIG. 2 illustrates a component diagram of an example virtual machine communicating using sockets in accordance with one or more aspects of the present disclosure.

FIG. 2 illustrates a component diagram of an example computing system where an application is in communication with an endpoint in accordance with one or more aspects of the present disclosure. As shown, the computer system 200 includes host 205 and endpoint 255. The host machine 205 includes hypervisor 210 and virtual machine 215. The virtual machine 215 includes a kernel 235 and endpoint 260. The kernel 235 manages operation of the virtual hardware within the virtual machine 215. The kernel 235 communicates with the hypervisor 210 using a control plane 245. In various examples, a control plane 245 may be a virtual I/O device configured to facilitate communication between the kernel 235 and the hypervisor 210. In certain examples, endpoint 260 may be a virtual device and/or process operating within the VM 215 capable of communicating via a network socket connection. For example, in one instance, an endpoint may be a second application executing on the computer system. In another instance, an endpoint may be a storage device within the VM or linked to the VM.

In this example, an application 225 is executing on virtual machine 215. The application 225 has requested a socket connection 230 with an endpoint 255. Kernel 235 communicates with the hypervisor 210 through the control plane 245 to determine whether the endpoint 255 exists local to the virtual machine 215 or is accessible via the host 205. As shown in this example, endpoint 255 is external to the host 205 an accessible via the host's network interface. The hypervisor 210 creates a virtual communication channel 240 that impersonates the socket 230, such that the application 225 believes that the socket 230 is in communication with endpoint 255. However, in this instance, the application 225 is actually using socket 230 to communicate with an endpoint socket 250 via the virtual communication channel 240. Additionally, the hypervisor 210 creates a socket 220 that connects to endpoint 255, which completes a communication channel between the application 225 and the endpoint 255. In this configuration, the application is capable of sending and/or receiving inputs/outputs (I/Os) from endpoint 255 via the endpoint socket 250, as will be further explained below. In various examples, a VM 215 and/or a kernel 235 may create a virtual socket 265 to impersonate the socket 230.

Figure 3:
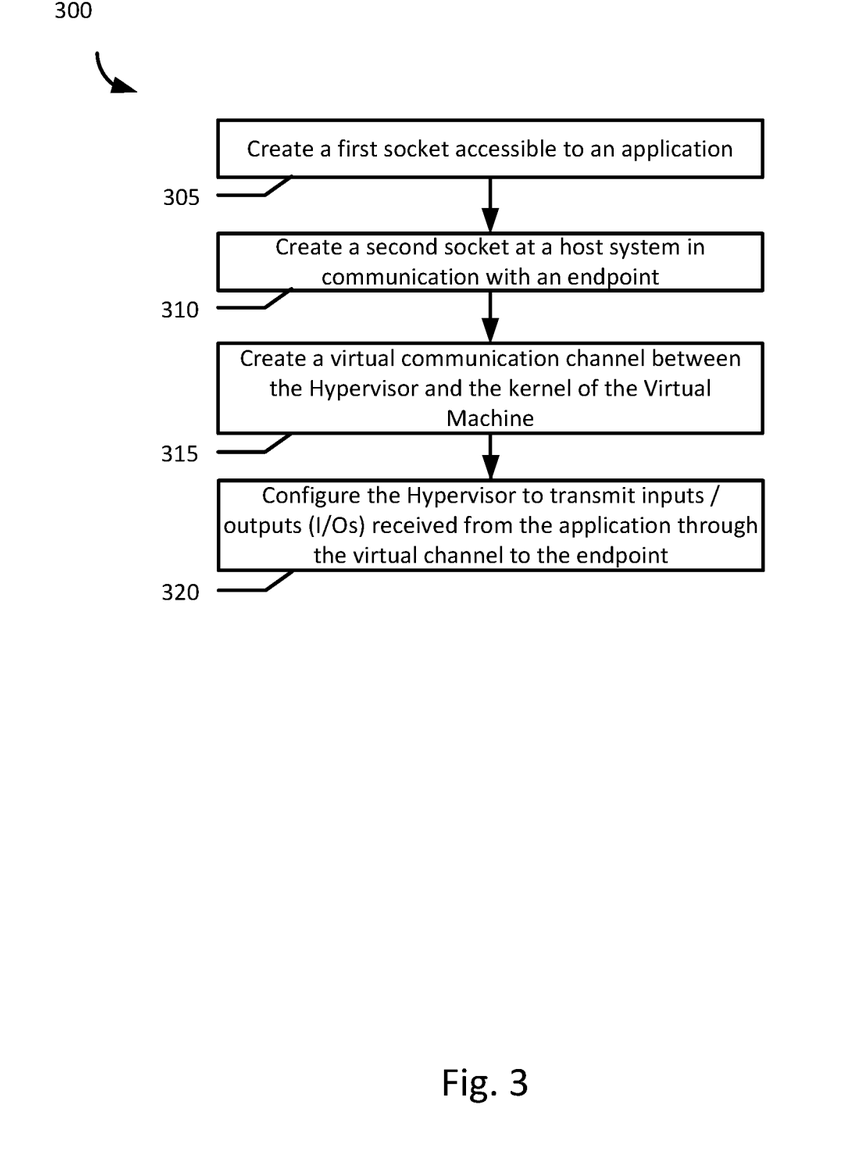
FIG. 3 illustrates a flowchart of an example method of transparently communicating with a device from a virtual machine in accordance with one or more aspects of the present disclosure.

FIG. 3 illustrates a flowchart of an example method of transparently communicating with a device from an application executed from a virtual machine, in accordance with an embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated and some of the blocks described are optional. The method 300 may be performed by processing logic that may comprise hardware (circuitry, dedicated logic, etc.), software, or a combination of both.

For example, this flowchart could be an example of how a backup agent (the application 225) connects to a storage device (endpoint 255) external to the both virtual machine 215 and the host 205. As shown in FIG. 3, the example method 300 includes creating a first socket accessible to an application (block 305). For example, the application 225 requests a socket connection with endpoint 255 to backup data from the virtual machine 215. In response, the kernel 235 creates the socket 230, which is accessible to the application 225. Next, the example method 300 includes creating a second socket at a host system in communication with an endpoint (block 310). In this instance, the kernel 235 does not know the location of the storage device (endpoint 255) and asks the hypervisor 210 for help. For example, the kernel 235 communicates with the hypervisor 210 via the control plane 245 to determine the location of endpoint 255.

In some instances, a requested endpoint could be located local to the virtual machine 215, such as a virtual storage driver mounted directly within the virtual machine 215. In other instances, a requested endpoint could be local to the host 205, such as another virtual machine residing on the host 205. In yet another instance, a requested endpoint could be external to the host 205, as shown in FIG. 2, such as an external storage device.

Next, the example method 300 includes creating a virtual communication channel between the hypervisor and the kernel of the virtual machine (block 315). For example, once the kernel 235 determines that the endpoint 255 is outside of the VM 215, the kernel 235 requests connection to the endpoint 255. The hypervisor 210, upon receiving the request, creates a virtual communication channel 240 and endpoint socket 250 to receive inputs/outputs (I/Os) from the application 225 via the socket 230. In various examples, a virtual communication channel 240 may be a virtual socket connection. Additionally, the hypervisor creates socket 220 to connect and communicate with endpoint 255, which in this instance is external to the host 205. Next, the example method 300 includes configuring the hypervisor to transmit inputs/outputs (I/Os) received from the application through the virtual channel to the endpoint (block 320). In this instance, the kernel 235 configures the hypervisor 210 to connect the communication chain between application 225 and endpoint 255. Upon completion of the communication chain from the application 225 to the endpoint 255, the application 225 is capable of receiving I/Os while implementing a single interface (i.e., a network socket interface, such as an AF_INET, AF_UNIX, or AF_INET6 socket). For example, once connected, a backup agent (application 225) would be aware of a connection to a storage device (endpoint 255), however not be aware of any intermediary devices and/or sockets implemented to create the connection. In various instances, the hypervisor 210 is capable of providing the kernel 235 information related to the endpoint socket 250 such that the socket 230 will be directed towards endpoint socket 250. In these instances, the kernel 235 enables socket 230 to impersonate a socket directly connected to the endpoint 255, thereby removing the requirement that the application be aware that it is executing on virtual machine 215. For example, the same application (e.g., application 225) may be installed and executed within a virtual machine, desktop machine, server, and/or network device and be fully functional without requiring changes to the network communication calls within the application.

Figure 4:
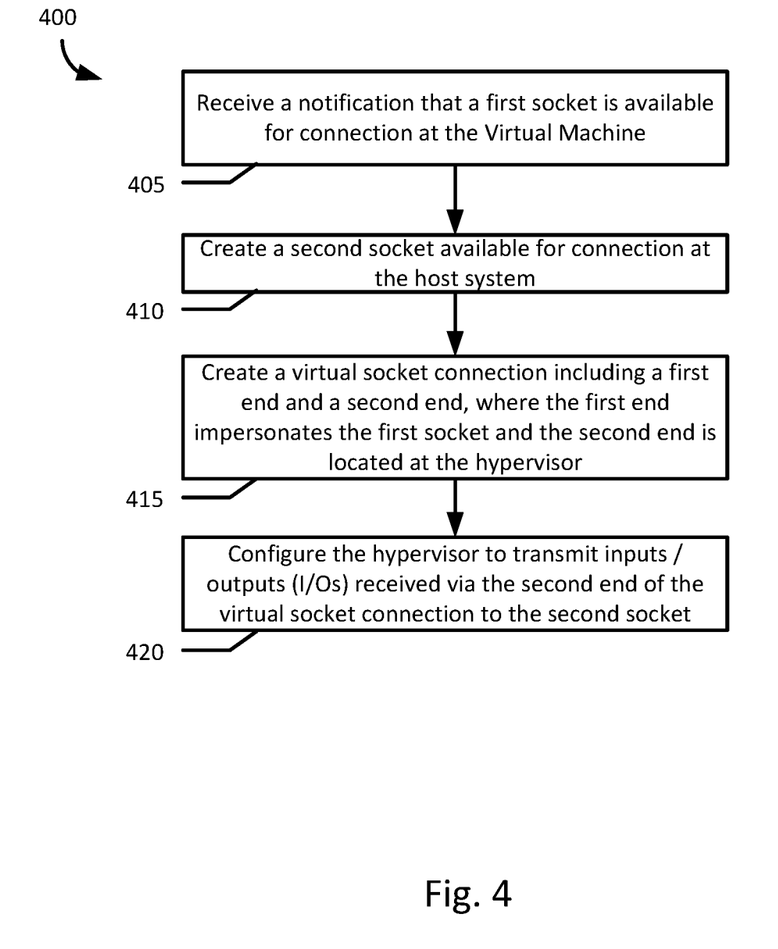
FIG. 4 illustrates a flowchart of an example method of transparently communicating with a device from a virtual machine using an impersonated socket in accordance with one or more aspects of the present disclosure.

FIG. 4 illustrates a flowchart of an example method of transparently communicating with a device from a virtual machine using an impersonated socket, in accordance with an embodiment of the present disclosure. Although the example method 300 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated and some of the blocks described are optional. The method 400 may be performed by processing logic that may comprise hardware (circuitry, dedicated logic, etc.), software, or a combination of both.

Example method 400 includes receiving a notification that a first socket is available for connection at the virtual machine (block 405). For example, a hypervisor 210 is capable of receiving communications from a virtual machine 215. The hypervisor 210 may receive a notification from the VM 215 that a socket 230 is available for connection at the virtual machine 215. Upon determining that the proposed endpoint 255 is not local to the VM 215, the VM 215 has requested that the hypervisor 210 complete the communication channel between the application 225 and the endpoint 255. In various embodiments, a hypervisor and a virtual machine may be in communication using a control plane. Next, the example method 400 includes creating a second socket available for connection at the host system (block 410). For example, the hypervisor 210 creates a socket 220 to communicate with the endpoint 255. Next, the example method includes creating a virtual socket connection including a first end and a second end, where the first end impersonates the first socket and the second end is located at the hypervisor (block 415).

For example, the hypervisor 210 is capable of creating a virtual communication channel 240 (e.g., a virtual socket connection) between the VM 215 and the hypervisor 210. The hypervisor 210 creates an endpoint socket 250, which is connected to the socket 230. The first end, at socket 230, impersonates a network socket connected to endpoint 255, while in reality, the socket 230 is connected to a second end, endpoint socket 250, using a virtual socket. Next, the example method 400 includes configuring the hypervisor to transmit inputs/outputs (I/Os) received via the second end of the virtual socket connection to the second socket (block 420). For example, once each communication channel is complete (i.e., the socket connection between hypervisor 210 and endpoint 255 and the virtual socket connection between socket 230 and endpoint socket 250), the hypervisor is configured to transmit inputs/outputs (I/Os) received from the application 225, via socket 230, through the socket 220 to the endpoint 255.

Figure 5:
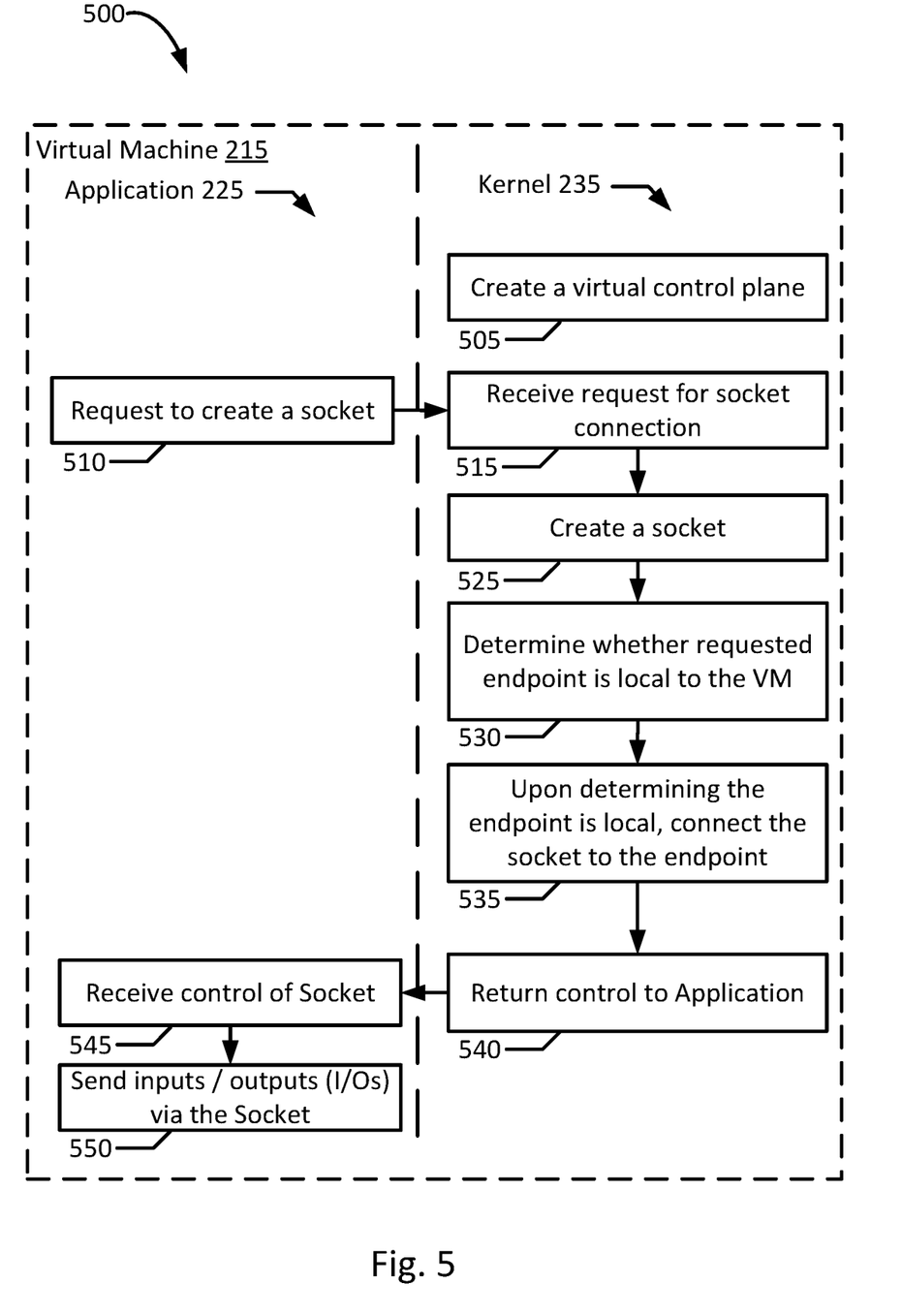
FIG. 5 illustrates a flow diagram of an example method of transparently communicating with a device local to the host from a virtual machine in accordance with one or more aspects of the present disclosure.

FIG. 5 illustrates a flow diagram of an example method of transparently communicating with a device local to the host from a virtual machine, in accordance with an embodiment of the present disclosure. Although the example method 500 is described with reference to the flow diagram illustrated in FIG. 5, it will be appreciated that many other methods of performing the acts associated with the method 500 may be used. For example, the order of some of the blocks may be changed, certain blocks may be combined with other blocks, blocks may be repeated, and some of the blocks described are optional. For example, in the illustrated flow diagram, a virtual machine 215 is in communication with a hypervisor 210 using control plane 245 while attempting create a communication channel with either endpoint 260 or endpoint 255. In this example, the example method 500 may implement communication between an audio reading application (application 225) and an audio processing application (endpoint 260), where each application is cooperating to process an audio sound.

As shown in FIG. 5, the kernel 235 creates a virtual control plane 245 (block 505) between the kernel 235 and hypervisor 210. In various examples, the virtual control plane 245 may provide the ability of the kernel 235 to determine what services and/or endpoints are available from the host 205. In these examples, available services and/or endpoints may include VMs hosted on the host 205, devices and/or computers external to the host 205, and/or the host 205 itself. As shown, the application 225 executing on virtual machine 215 requests to create a socket (block 510) to endpoint 260. The kernel 235 receives the request for a socket connection (block 515) and creates a socket 230 (block 525). The kernel 235 analyzes the request and queries the hypervisor 210, via the control plane 245, to determine whether the requested endpoint 260 is local to the VM 215 (block 530). In this example, the kernel 235 determines the requested endpoint 260 is local to the VM 215 and connects the socket 230 to the endpoint 260 (block 535). Next, the kernel 235 returns control to the application 225 (block 540). Upon receiving control of the socket 230 (block 545), the application 225 on the VM 215 sends inputs/outputs (I/Os) to the endpoint 260 via the socket 230.

Figure 6A:
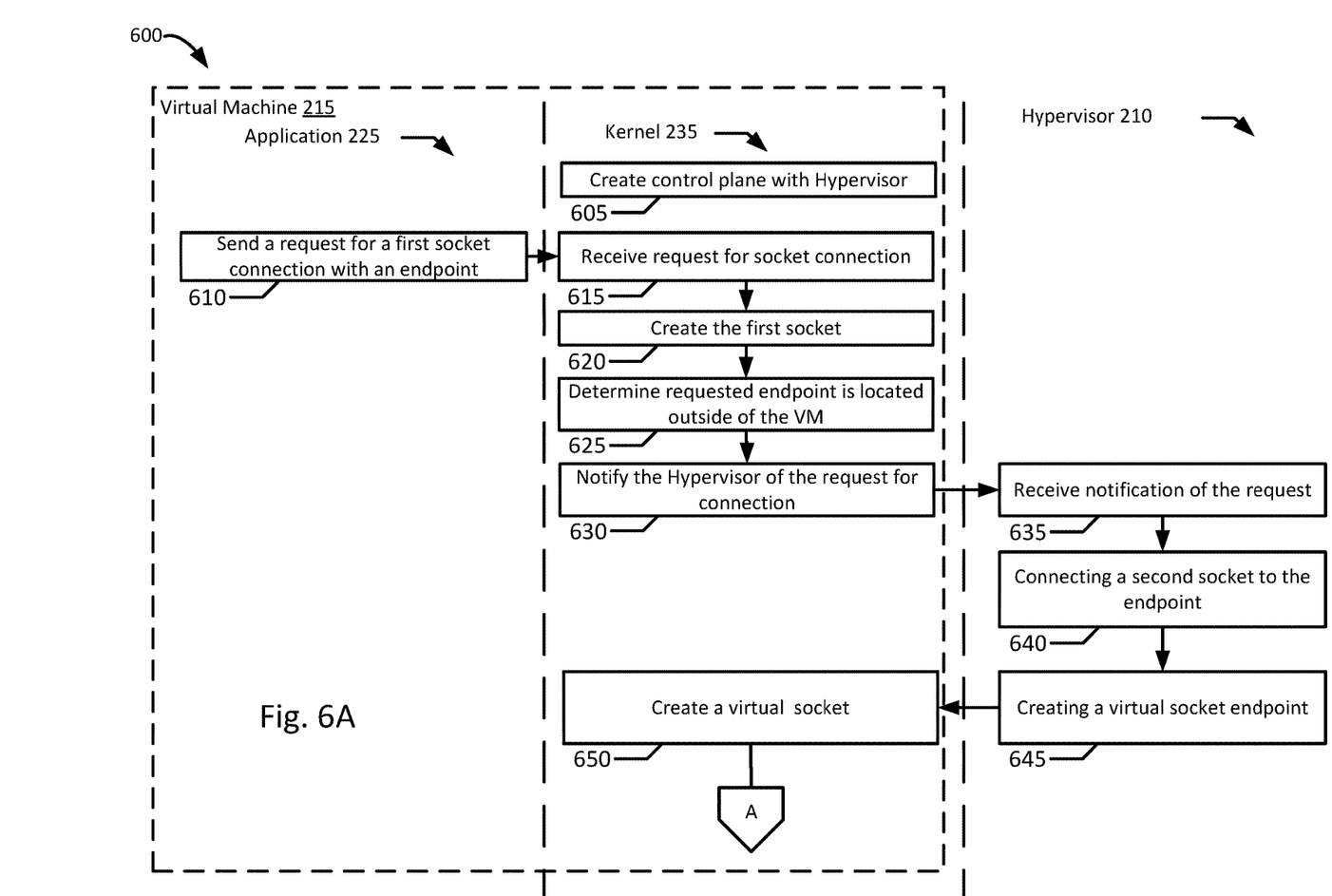
FIGS. 6A and 6B illustrate a flow diagram of an example method of transparently communicating with a device from a virtual machine in accordance with one or more aspects of the present disclosure.
Figure 6B:
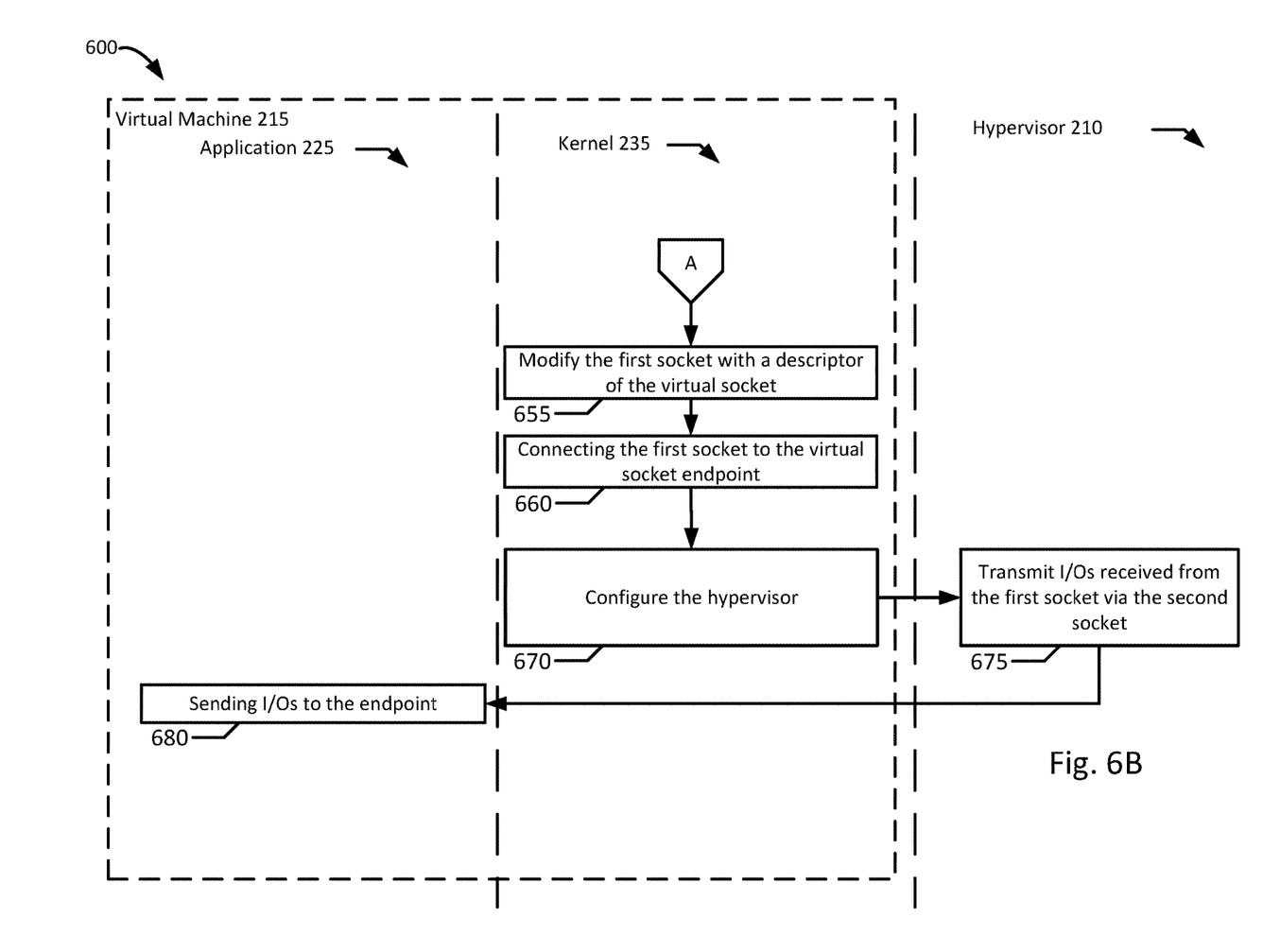

FIGS. 6A and 6B illustrate flow diagrams of example methods of transparently communicating with a device from a virtual machine in accordance with one or more aspects of the present disclosure. Although the example method 600 is described with reference to the flow diagram illustrated in FIG. 6, it will be appreciated that many other methods of performing the acts associated with the method 600 may be used. For example, the order of some of the blocks may be changed, certain blocks may be combined with other blocks, blocks may be repeated, and some of the blocks described are optional. For example, in the illustrated flow diagram, a virtual machine 215 is in communication with a hypervisor 210 using control plane 245 while attempting to create a communication channel with endpoint 255. In this example, the example method 500 may be implementing communication between a web browser (application 225) located on VM 215 and a web content server (endpoint 255) external to the VM 215.

As shown in FIG. 6A, the kernel 235 creates a control plane 245 with the hypervisor 210 (block 605). In various examples, the control plane 245 may be a virtual I/O device configured to facilitate communication between the hypervisor 210 and the kernel 235. The web browser (application 225) sends a request for a first socket connection with a web content server (endpoint 255) (block 610). Upon receiving the request for the socket connection (block 615), the kernel 235 creates the first socket 230 (block 620) and analyzes the request to determine whether the web content server (endpoint 255) is local or external to the VM 215. In various examples, the kernel 235 is capable of querying the hypervisor 210 to determine whether an endpoint exists. In some examples, the kernel 235 is capable of querying the hypervisor 210 to determine which services may be available from the host 205 and/or other VMs located on the host 205.

In this instance, the kernel 235 determines that the web content server (endpoint 255) is external to the VM 215 (block 625) and notifies the hypervisor 210 of the request for a network connection (block 630). In various examples, a requested endpoint may be a second VM hosted on the host system. In some examples, the requested endpoint may be the host system itself. In certain examples, the requested endpoint may be a device, computer, and/or server external to the host system. The hypervisor 210 receives the notification of the request (block 635) and creates a socket 220. The hypervisor 210 connects the socket 220 to the web content server (endpoint 255) (block 640). Subsequently, the hypervisor 210 creates an endpoint socket 250, which is a virtual socket endpoint (block 645). The hypervisor 210 returns information related to the endpoint socket 250 (e.g., the descriptor of the socket) to the kernel 235. The kernel 235 creates a virtual socket 265 at the VM 215 (block 250).

A shown in FIG. 6B, the kernel 235 modifies the first socket with a descriptor of the virtual socket 265 created at the VM 215 (block 655) and connects the first socket 230 to the virtual endpoint socket 250 (block 660). In some examples, a descriptor may be used to reconfigure a socket from a network socket to a virtual socket. In other examples, a network socket may be replaced by a virtual socket that impersonates the network socket. In many examples, the application 225 may not be aware that the socket 230 is not a direct network connection with an endpoint 255. The kernel 235 then configures the hypervisor (block 670) to complete the communication channel between the web browser (application 225) and the web content server (endpoint 255). In this instance, the hypervisor 210 is configured to transmit inputs/outputs (I/Os) received from the first socket 230 via the second socket 220 (block 675). Upon completion of the communication channel, the web browser (application 225) is enabled to send I/Os to the web content server (endpoint 255) via the socket 230.

Figure 7:
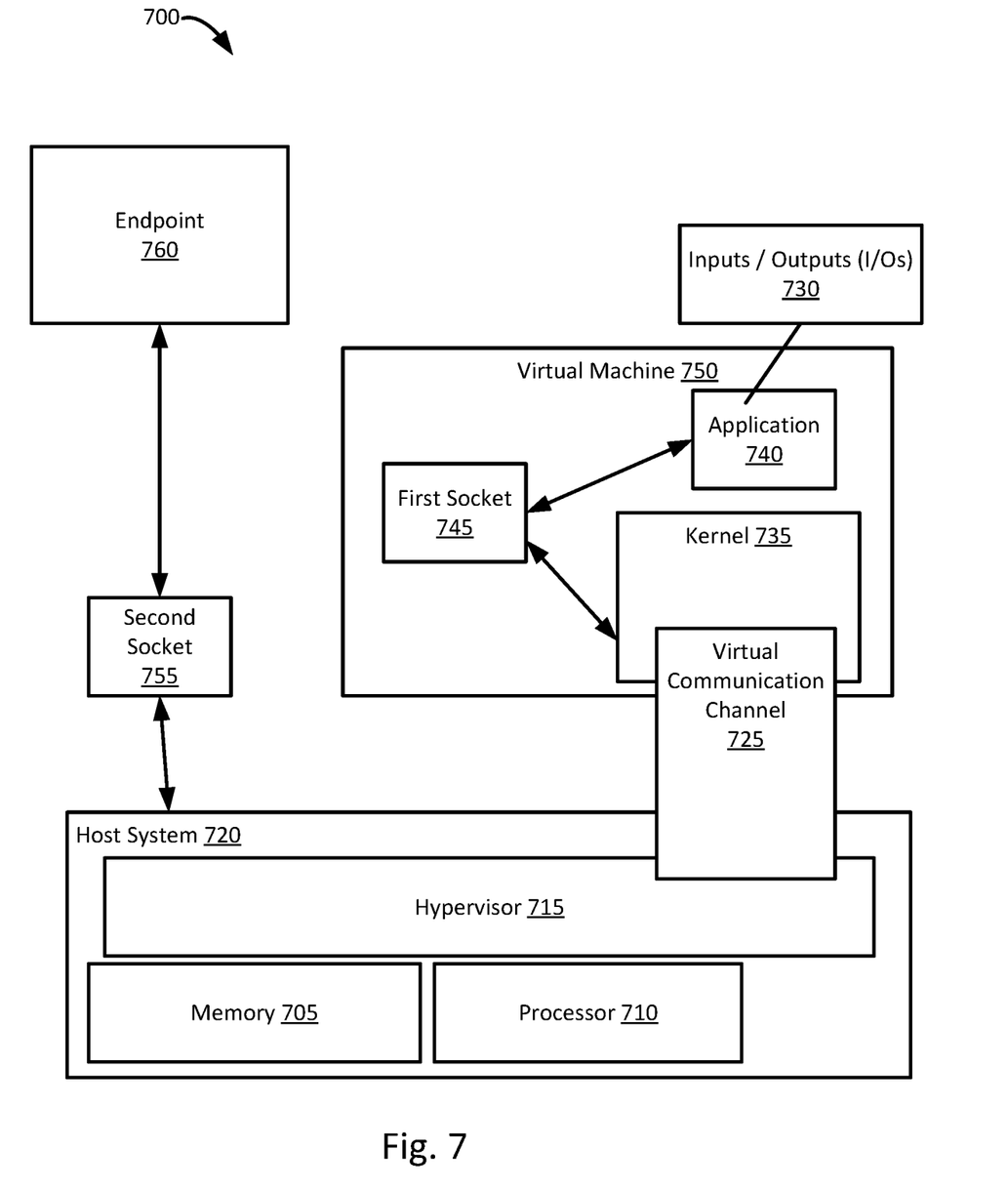
FIG. 7 is a block diagram of an example system communicating with a device from a virtual machine according to an example embodiment of the present disclosure.

FIG. 7 is a block diagram of system 700 which includes a hypervisor 715, a virtual machine (VM) 750, and a host system 720. The VM 750 includes a kernel 735 and an application 740 and the VM 750 is in communication with the hypervisor 715. The host system 720 includes a memory 705 and a processor 710. The processor 710 is in communication with the memory 705 and the host system 720 hosts the VM 750 and the hypervisor 715. The processor 710 is configured to perform creating, via the kernel 735, a first socket 745 accessible to the application 740. The host system 720 creates a second socket 755 in communication with an endpoint 760. A virtual communication channel 725 is created between the hypervisor 715 and the kernel 735 of the VM 750 connecting the first socket 745 to the hypervisor 715. The hypervisor 715 is configured to transmit inputs/outputs (I/Os) 730 received from the application 740 through the virtual communication channel 725 to the endpoint 760 via the second socket 755.

Figure 8:
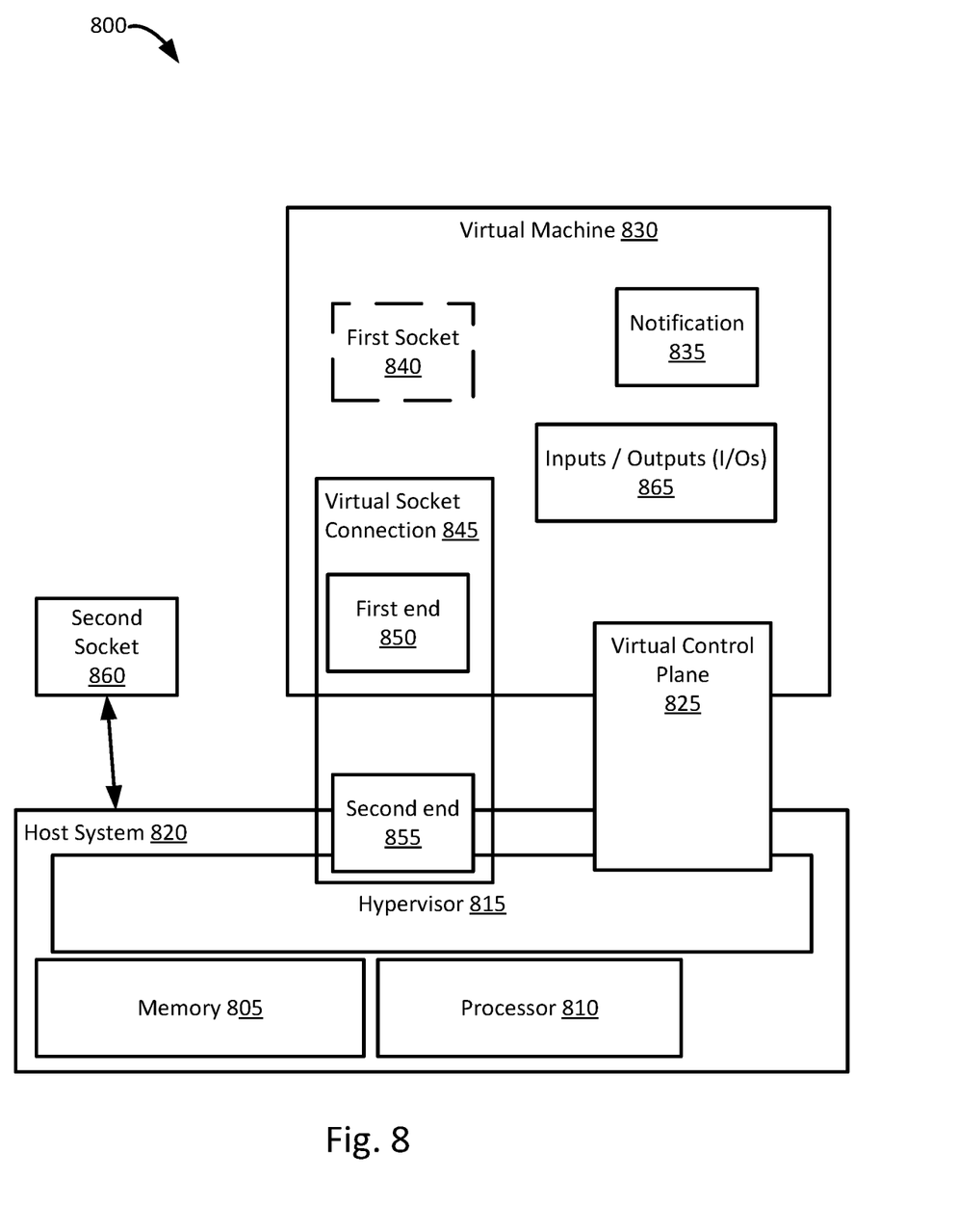
FIG. 8 is a block diagram of an example system communicating with a device from a virtual machine using socket impersonation according to one or more aspects of the present disclosure.

FIG. 8 is a block diagram of a system 800 which includes a hypervisor 815, a virtual machine (VM) 830, and a host system 820. The VM 830 is in communication with the hypervisor 815 using a virtual control plane 825. The host system includes a memory 805 and a processor 810, where the processor 810 is in communication with the memory 805. Additionally, the host system 820 hosts the VM 830 and the hypervisor 815. In this example, the processor 810 is configured to perform receiving a notification 835, via the virtual control plane 825, that a first socket 840 is available for connection at the VM 830. A second socket 860 is created at the host system 820 that is available for connection. Additionally, a virtual socket connection 845 is created including a first end 850 and a second end 855, where the first end 850 impersonates the first socket 840 and the second end 855 is located at the hypervisor 815. The hypervisor 815 is configured to transmit inputs/outputs (I/Os) 865 received via the second end 855 of the virtual socket connection 845 to the second socket 860.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system, comprising: a hypervisor; a virtual machine (VM) including a kernel and an application, wherein the VM is in communication with the hypervisor; a host system including a memory and one or more processors, wherein the one or more processors are in communication with the memory and the host system hosts the VM and the hypervisor; and wherein the one or more processors is configured to perform: creating, via the kernel, a first socket accessible to the application; creating a second socket at the host system in communication with an endpoint; creating a virtual communication channel between the hypervisor and the kernel of the VM connecting the first socket to the hypervisor; and configuring the hypervisor to transmit inputs/outputs (I/Os) received from the application through the virtual channel to the endpoint via the second socket.

In a 2nd exemplary aspect of the present disclosure, which may be used in combination with any one of more of the preceding aspects (i.e., the 1st aspect), where the one or more processors is further configured to perform: creating, via the kernel, a third socket accessible to the application; notifying the hypervisor, via the kernel, that the third socket is requesting a connection to the host system; creating a forth socket at the hypervisor; and connecting the forth socket to the third socket.

In a 3rd exemplary aspect of the present disclosure, which may be used in combination with any one of more of the preceding aspects (i.e., the 1st aspect), where the first socket is a network socket.

In a 4th exemplary aspect of the present disclosure, where a second VM is hosted on the host system where the second VM is the endpoint In a 5th exemplary aspect of the present disclosure, which may be used in combination with any one of more of the preceding aspects (i.e., the 1st aspect), where the one or more processors is further configured to perform: receiving a packet via the second socket; sending the packet to the application via the first socket.

In a 6th exemplary aspect of the present disclosure, which may be used in combination with any one of more of the preceding aspects (i.e., the 1st aspect), where the kernel communicates with the hypervisor through a virtual I/O device.

In a 7th exemplary aspect of the present disclosure, which may be used in combination with any one of more of the preceding aspects (i.e., the 1st aspect), where the one or more processors is further configured to perform requesting, via the kernel, confirmation that the endpoint exists.

In a 8th exemplary aspect of the present disclosure, which may be used in combination with any one of more of the preceding aspects (i.e., the 1st aspect), where the one or more processors is further configured to perform requesting information, via the kernel, related to services available on the host system.

Aspects of the subject matter described herein may be useful alone or in combination with one or more other aspects described herein. In a 9th exemplary aspect of the present disclosure, a method, including: creating, via a kernel within a virtual machine (VM), a first socket accessible to an application on the VM; wherein the VM is hosted by a host system and in communication with a hypervisor; creating a second socket at the host system in communication with an endpoint; creating a virtual communication channel between the hypervisor and the kernel of the VM connecting the first socket to the hypervisor; and configuring the hypervisor to transmit inputs/outputs (I/Os) received from the application through the virtual channel to the endpoint via the second socket.

In a 10th exemplary aspect of the present disclosure, which may be used in combination with any one of more of the preceding aspects (i.e., the 9th aspect), where the method further comprising: creating, via the kernel, a third socket accessible to the application; notifying the hypervisor, via the kernel, that the third socket is requesting a connection to the host system; creating a forth socket at the hypervisor; and connecting the forth socket to the third socket.

In a 11th exemplary aspect of the present disclosure, which may be used in combination with any one of more of the preceding aspects (i.e., the 9th aspect), where the first socket is a network socket.

In a 12th exemplary aspect of the present disclosure, which may be used in combination with any one of more of the preceding aspects (i.e., the 9th aspect), where the first socket is an UNIX socket.

In a 13th exemplary aspect of the present disclosure, which may be used in combination with any one of more of the preceding aspects (i.e., the 9th aspect), where the method further comprising: receiving a packet via the second socket; sending the packet to the application via the first socket.

In a 14th exemplary aspect of the present disclosure, which may be used in combination with any one of more of the preceding aspects (i.e., the 9th aspect), where the kernel communicates with the hypervisor through a virtual I/O device.

In a 15th exemplary aspect of the present disclosure, which may be used in combination with any one of more of the preceding aspects (i.e., the 9th aspect), where the method further comprises requesting, via the kernel, confirmation that the endpoint exists.

In a 16th exemplary aspect of the present disclosure, which may be used in combination with any one of more of the preceding aspects (i.e., the 9th aspect), where the method further comprises requesting information, via the kernel, related to services available on the host system.

Aspects of the subject matter described herein may be useful alone or in combination with one or more other aspects described herein. In a 17th exemplary aspect of the present disclosure, a non-transitory machine readable medium storing code, which when executed by a processor is configured to: create, via a kernel within a virtual machine (VM), a first socket accessible to an application on the VM; wherein the VM is hosted by a host system and the VM is in communication with a hypervisor; create a second socket at the host system in communication with an endpoint; create a virtual communication channel between the hypervisor and the kernel of the VM connecting the first socket to the hypervisor; and configure the hypervisor to transmit inputs/outputs (I/Os) received from the application through the virtual channel to the endpoint via the second socket.

In a 18th exemplary aspect of the present disclosure, which may be used in combination with any one of more of the preceding aspects (i.e., the 17th aspect), where the code, when executed by a processor, is further configured to: create, via the kernel, a third socket accessible to the application; notify the hypervisor, via the kernel, that the third socket is requesting a connection to the host system; create a forth socket at the hypervisor; and connect the forth socket to the third socket.\

In a 19th exemplary aspect of the present disclosure, which may be used in combination with any one of more of the preceding aspects (i.e., the 17th aspect), where the first socket is a network socket.

In a 20th exemplary aspect of the present disclosure, which may be used in combination with any one of more of the preceding aspects (i.e., the 17th aspect), where the first socket is an UNIX socket.

In a 21st exemplary aspect of the present disclosure, which may be used in combination with any one of more of the preceding aspects (i.e., the 17th aspect), where the code, when executed by a processor, is further configured to: receive a packet via the second socket; send the packet to the application via the first socket.

In a 22nd exemplary aspect of the present disclosure, which may be used in combination with any one of more of the preceding aspects (i.e., the 17th aspect), where the kernel communicates with the hypervisor through a virtual I/O device.

In a 23rd exemplary aspect of the present disclosure, which may be used in combination with any one of more of the preceding aspects (i.e., the 17th aspect), where the code, when executed by a processor, is further configured to request, via the kernel, confirmation that the endpoint exists.

In a 24th exemplary aspect of the present disclosure, which may be used in combination with any one of more of the preceding aspects (i.e., the 17th aspect), where the code, when executed by a processor, is further configured to request information, via the kernel, related to services available on the host system.

Aspects of the subject matter described herein may be useful alone or in combination with one or more other aspects described herein. In a 25th exemplary aspect of the present disclosure, a system, including a hypervisor; a virtual machine (VM) in communication with the hypervisor using a virtual control plane; a host system including a memory and one or more processors, wherein the one or more processors are in communication with the memory and the host system hosts the VM and the hypervisor; and wherein the one or more processors is configured to perform: receiving a notification, via the virtual control plane, that a first socket is available for connection at the virtual machine (VM); creating a second socket available for connection at the host system; creating a virtual socket connection including a first end and a second end, where the first end impersonates the first socket and the second end is located at the hypervisor; and configuring the hypervisor to transmit inputs/outputs (I/Os) received via the second end of the virtual socket connection to the second socket.

In a 26th exemplary aspect of the present disclosure, which may be used in combination with any one of more of the preceding aspects (i.e., the 25th aspect), where the virtual control plane is a virtual I/O device connecting the VM to the hypervisor.

In a 27th exemplary aspect of the present disclosure, which may be used in combination with any one of more of the preceding aspects (i.e., the 25th aspect), where creating the virtual socket connection comprises: creating a third socket, wherein the third socket is a virtual socket; sending a descriptor of the third socket to the VM to reconfigure the first socket from a network socket to a virtual socket; connecting the third socket to the first socket, wherein the application is unaware the configuration of the first socket has changed.

In a 28th exemplary aspect of the present disclosure, which may be used in combination with any one of more of the preceding aspects (i.e., the 25th aspect), where the one or more processors is further configured to perform: receiving a request for information regarding services available at the host system; querying the host system for available services; responding to the request.

In a 29th exemplary aspect of the present disclosure, which may be used in combination with any one of more of the preceding aspects (i.e., the 25th aspect), where the first socket is a network socket.

In a 30th exemplary aspect of the present disclosure, which may be used in combination with any one of more of the preceding aspects (i.e., the 25th aspect), where the first socket is a UNIX socket.

Aspects of the subject matter described herein may be useful alone or in combination with one or more other aspects described herein. In a 31st exemplary aspect of the present disclosure, a method, comprising: receiving a notification, via a virtual control plane between a hypervisor and a kernel of a virtual machine (VM), that a first socket is available for connection at the VM; wherein the VM is hosted on a host system; creating a second socket available for connection at the host system; creating a virtual socket connection including a first end and a second end, where the first end impersonates the first socket and the second end is located at the hypervisor; and configuring the hypervisor to transmit inputs/outputs (I/Os) received via the second end of the virtual socket connection to the second socket.

In a 32nd exemplary aspect of the present disclosure, which may be used in combination with any one of more of the preceding aspects (i.e., the 31st aspect), where the virtual control plane is a virtual I/O device connecting the VM to the hypervisor.

In a 33rd exemplary aspect of the present disclosure, which may be used in combination with any one of more of the preceding aspects (i.e., the 31st aspect), where creating the virtual socket connection comprises: creating a third socket, wherein the third socket is a virtual socket; sending a descriptor of the third socket to the VM to reconfigure the first socket from a network socket to a virtual socket; connecting the third socket to the first socket, wherein the application is unaware the configuration of the first socket has changed.

In a 34th exemplary aspect of the present disclosure, which may be used in combination with any one of more of the preceding aspects (i.e., the 31st aspect), where the method further comprising: receiving a request for information regarding services available at the host system; querying the host system for available services; responding to the request.

In a 35th exemplary aspect of the present disclosure, which may be used in combination with any one of more of the preceding aspects (i.e., the 31st aspect), where the first socket is a network socket.

In a 36th exemplary aspect of the present disclosure, which may be used in combination with any one of more of the preceding aspects (i.e., the 31st aspect), where the first socket is a UNIX socket.

Aspects of the subject matter described herein may be useful alone or in combination with one or more other aspects described herein. In a 37th exemplary aspect of the present disclosure, a non-transitory machine readable medium storing code, which when executed by a processor is configured to: receive a notification, via a control plane between a hypervisor and a kernel of a virtual machine (VM), that a first socket is available for connection at the VM; wherein the VM is hosted on a host system; create a second socket available for connection at the host system; create a virtual socket connection including a first end and a second end, where the first end impersonates the first socket and the second end is located at the hypervisor; and configure the hypervisor to transmit inputs/outputs (I/Os) received via the second end of the virtual socket connection to the second socket.

In a 38th exemplary aspect of the present disclosure, which may be used in combination with any one of more of the preceding aspects (i.e., the 37th aspect), where the virtual control plane is a virtual I/O device connecting the VM to the hypervisor.

In a 39th exemplary aspect of the present disclosure, which may be used in combination with any one of more of the preceding aspects (i.e., the 37th aspect), where creating the virtual socket connection comprises: create a third socket, wherein the third socket is a virtual socket; send a descriptor of the third socket to the VM to reconfigure the first socket from a network socket to a virtual socket; connect the third socket to the first socket, wherein the application is unaware the configuration of the first socket has changed.

In a 40th exemplary aspect of the present disclosure, which may be used in combination with any one of more of the preceding aspects (i.e., the 37th aspect), where the code, when executed by a processor, is further configured to: receive a request for information regarding services available at the host system; query the host system for available services; respond to the request.

In a 41st exemplary aspect of the present disclosure, which may be used in combination with any one of more of the preceding aspects (i.e., the 37th aspect), where the first socket is a network socket.

In a 42nd exemplary aspect of the present disclosure, which may be used in combination with any one of more of the preceding aspects (i.e., the 37th aspect), where the first socket is a UNIX socket.

Aspects of the subject matter described herein may be useful alone or in combination with one or more other aspects described herein. In a 43rd exemplary aspect of the present disclosure, a system, comprising: a means for receiving a notification, via a virtual control plane between a hypervisor and a kernel of a virtual machine (VM), that a first socket is available for connection at the VM; wherein the VM is hosted on a host system; a means for creating a second socket available for connection at the host system; a means for creating a virtual socket connection including a first end and a second end, where the first end impersonates the first socket and the second end is located at the hypervisor; and a means for configuring the hypervisor to transmit inputs/outputs (I/Os) received via the second end of the virtual socket connection to the second socket.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system, comprising:
a hypervisor;
a virtual machine (VM) including a kernel and an application, wherein the VM is in communication with the hypervisor;
a host system including a memory and one or more processors, wherein the one or more processors are in communication with the memory and the host system hosts the VM and the hypervisor; and
wherein the one or more processors is configured to perform:
determining, by the kernel, whether an endpoint, which is requested by the application, exists;
creating, via the kernel, a first socket accessible to the application;
determining, by the kernel, a location of the endpoint;
creating a second socket at the host system in communication with the endpoint;
creating a virtual communication channel between the hypervisor and the kernel of the VM connecting the first socket to the hypervisor; and
configuring the hypervisor, based on the location of the endpoint, to transmit inputs/outputs (I/Os) received from the application through the virtual channel to the endpoint via the second socket.

2. The system of claim 1, wherein the one or more processors is further configured to perform:
creating, via the kernel, a third socket accessible to the application;
notifying the hypervisor, via the kernel, that the third socket is requesting a connection to the host system;
creating a forth socket at the hypervisor; and
connecting the forth socket to the third socket.

3. The system of claim 1, wherein the first socket is a network socket.

4. The system of claim 1, further comprising:
a second VM hosted on the host system; and
wherein the second VM is the endpoint.

5. The system of claim 1, wherein the one or more processors is further configured to perform:
receiving a packet via the second socket; and
sending the packet to the application via the first socket.

6. The system of claim 1, wherein the kernel communicates with the hypervisor through a virtual I/O device.

7. The system of claim 1, wherein the endpoint is one of a plurality of endpoints in communication with the application, and each of the plurality of endpoints is one of located local to the VM, located local to the host, located on another VM residing on the host, or located external to the host.

8. A method, comprising:
determining, by a kernel within a virtual machine (VM), whether an endpoint, which is requested by an application on the VM, exists;
creating, via the kernel a first socket accessible to the application, wherein the VM is hosted by a host system and in communication with a hypervisor;
determining, by the kernel, a location of the endpoint;
creating a second socket at the host system in communication with the endpoint;
creating a virtual communication channel between the hypervisor and the kernel of the VM connecting the first socket to the hypervisor; and
configuring the hypervisor, based on the location of the endpoint, to transmit inputs/outputs (I/Os) received from the application through the virtual channel to the endpoint via the second socket.

9. The method of claim 8, further comprising:
creating, via the kernel, a third socket accessible to the application;

notifying the hypervisor, via the kernel, that the third socket is requesting a connection to the host system;

creating a forth socket at the hypervisor; and connecting the forth socket to the third socket.

10. The method of claim 8, wherein the first socket is a network socket.

11. The method of claim 8, wherein the first socket is an UNIX socket.

12. The method of claim 8, further comprising:
receiving a packet via the second socket; and
sending the packet to the application via the first socket.

13. The method of claim 8, wherein the kernel communicates with the hypervisor through a virtual I/O device.

14. A system, comprising:
a hypervisor;
a virtual machine (VM) in communication with the hypervisor using a virtual control plane;
a host system including a memory and one or more processors, wherein the one or more processors are in communication with the memory and the host system hosts the VM and the hypervisor; and
wherein the one or more processors is configured to perform:
 determining, by the kernel, whether an endpoint, which is requested by the application, exists;
 receiving a notification, via the virtual control plane, that a first socket is available for connection at the virtual machine (VM);
 determining, by the kernel, a location of the endpoint;
 creating a second socket available for connection at the host system;
 creating a virtual socket connection including a first end and a second end, where the first end impersonates the first socket and the second end is located at the hypervisor; and
 configuring the hypervisor, using the location of the endpoint, to create a communication chain from the application to the endpoint by transmitting inputs/outputs (I/Os) received via the second end of the virtual socket connection to the second socket such that the application is not aware of any intermediary devices or sockets implemented to create the connection.

15. The system of claim 14, wherein the virtual control plane is a virtual I/O device connecting the VM to the hypervisor.

16. The system of claim 14, wherein creating the virtual socket connection comprises:
creating a third socket, wherein the third socket is a virtual socket;
sending a descriptor of the third socket to the VM to reconfigure the first socket from a network socket to a virtual socket;
connecting the third socket to the first socket, wherein the application is unaware the configuration of the first socket has changed.

17. The system of claim 14, wherein the one or more processors is further configured to perform:
receiving a request for information regarding services available at the host system;
querying the host system for available services;
responding to the request.

18. The system of claim 14, wherein the first socket is a network socket.

19. The system of claim 14, wherein the first socket is a UNIX socket.

20. The system of claim 14, wherein the endpoint is one of a plurality of endpoints in communication with the application, and each of the plurality of endpoints is one of located local to the VM, located local to the host, located on another VM residing on the host, or located external to the host.

* * * * *